March 15, 1938. N. F. W. HAZELDINE 2,111,048
PROCESS FOR CONSERVING FRUIT AND VEGETABLE JUICES
Filed Feb. 13, 1932
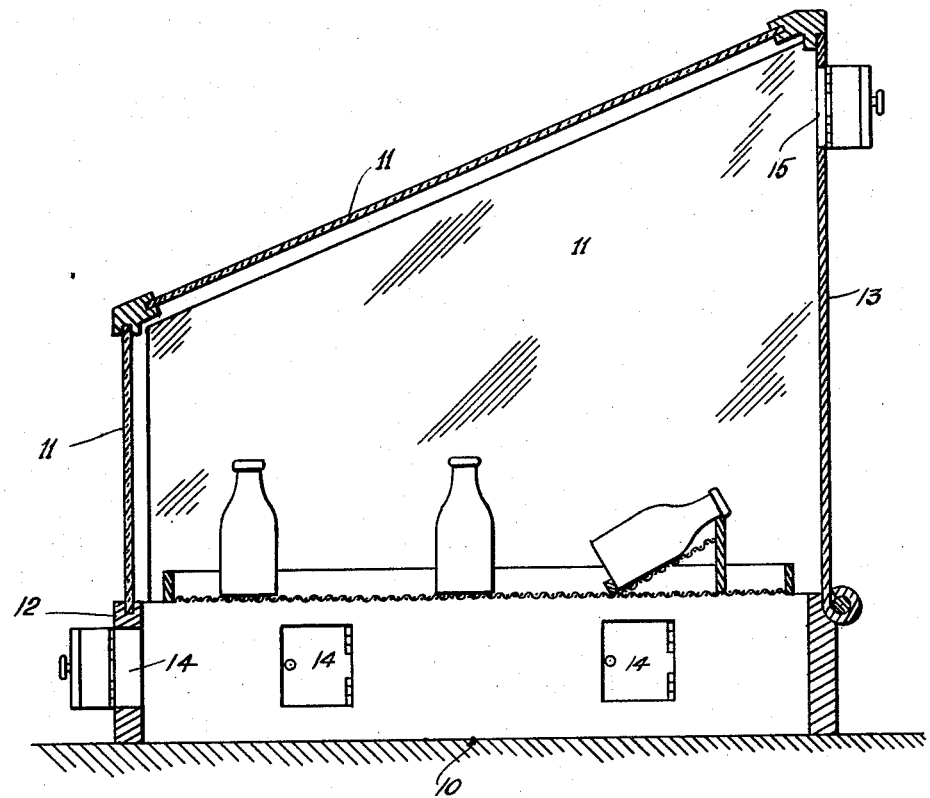
Inventor.
Norton F. W. Hazeldine - Deceased.
Lillian Brown Hazeldine - Executrix.
Attorney.

Patented Mar. 15, 1938

2,111,048

UNITED STATES PATENT OFFICE 2,111,048

PROCESS FOR CONSERVING FRUIT AND VEGETABLE JUICES

Norton F. W. Hazeldine, deceased, late of Redlands, Calif., by Lillian Brown Hazeldine, administratrix, Redlands, Calif.

Application February 13, 1932, Serial No. 592,811

7 Claims. (Cl. 99—155)

This invention has reference to processes for conserving and preserving fruit and vegetable juices, and to a particular process characterized by its capability for conserving such products to retain their natural food value, freshness, flavor and color, without resort to the common expedients for preserving, as by refrigeration, addition of preservative adulterants, cooking or the like. Briefly stated, the present process operates to accomplish conservation of the above named class of products in apparently natural condition, through the sole agency of solar energy applied in the treatment of the products as hereinafter described.

The present application is a continuation-in-part of application on Process of conserving and vitalizing organic matter, filed March 9, 1925, and bearing Ser. No. 14,306, of said Norton F. W. Hazeldine.

Upon consideration of the fact that heretofore preservation of such acid containing materials as fruit and vegetable juices, in such manner as to retain the food value, flavor and other characteristics of the fresh fruit or vegetable juices, has been impossible of attainment, since the use of common preserving expedients almost always results in very perceptible changes in the characteristics of the materials, the advantages and commercial importance of the invention will be readily appreciated. In addition to conserving products that usually require some treatment or adulteration for preserving them, the present process effectively preserves materials which, under normal temperature conditions, have always been considered impossible of preservation in a condition resembling their natural state. Of such materials, pure orange and lemon juices may be cited as typical. Another advantage of the process arises from the fact that not only will treated products of the class named, be placed in a state of preservation, but they will remain in such condition over long periods of time.

In the actual practice of my process, I use a structure such as diagrammatically shown in the accompanying drawing, wherein the view is a vertical section. This structure may have any suitable floor or foundation 10. Its south, east, and west walls 11 may either be of a suitable transparent material such as glass, or may be partially of opaque or heat insulating material such, for instance, as pulp board or wood, as shown at 12. It is preferred to make these walls for the most part of such transparent material as glass, so that a large floor or tray area within the structure may be kept in exposure to direct solar radiation at all times. Glass used for the roof and these walls may be of various kinds, subject only to the provision that it shall pass the greater part or substantially the whole of solar radiant energy. The object in using glass for the south, east, and west walls is to insure maximum access of solar radiation directly to the matter being treated. The use of prism or similar glass has the same general effect, the oblique solar rays from the rising or setting sun being reflected more squarely into the enclosed space. The final effect is to obtain high efficiency in the utilization of solar energy throughout most of the hours when the sun is above the horizon.

Ordinary clear glass will suffice, though it is not objectionable to use glass that disperses the light, as, for instance, prism glass. Although I have found that clear glass of a greenish hue or of a violet hue will be perfectly satisfactory, I have found that any glass that cuts off any substantial part of the sun's radiation does not give satisfactory results. Of course, any glass cuts off the ultraviolet rays of the sun's radiation, but the presence of ultraviolet light does not seem to be necessary to my process. On the other hand, if a glass is used that cuts off the blue-green end of the visible spectrum, the results are not satisfactory; and the same is true of any glass that cuts off the yellow-red end of the spectrum. The glass of greenish or violet hue that I speak of as being satisfactory is glass that is clear but has a faint hue. I have not been able to obtain satisfactory results if ordinary red, amber, green or blue glass is used. And in conformance with that fact I have not been able to obtain satisfactory results where the material under treatment is contained in a brown or blue bottle for instance. However, satisfactory results are obtained where the material under treatment is put into what is ordinarily known as a green glass bottle—a clear bottle having a faint green hue.

The back wall 13 of the structure is made of any substance that is heat reflective to a fairly high degree. For instance, I have found it satisfactory to provide a back wall of metal or wood or pulp board painted white on its interior surface in order to obtain a high efficiency of reflection onto the material under treatment. The roof slope may vary in accordance with the latitude at any one place where the process is being carried on. At the latitude of Los Angeles I find a slope of about 23% effective. In general the slope of the roof will be determined with the view of having its plane at as nearly as possible a mean normal to the sun's rays throughout the period of available sunlight during the day.

It may be desirable to provide means for causing a certain amount of ventilation in the structure. Such ventilation means may be arranged in any suitable manner, but I prefer to use the draft created by natural convection currents within the structure, and for that purpose there may be ventilation openings 14 in the lower part of the front and side walls, and openings 15 at the upper part of the rear wall. This ventilation is preferably controlled so that the amount of air passing through the structure and the temperature within the structure may be regulated. For certain purposes, as where it is desired to prevent the temperatures from exceeding a certain maximum, this ventilation control is desirable to keep the temperature down.

A typical case of treatment out of contact with the atmosphere is involved when I treat the juices of citrus fruit. It has long been known that the liquid content of citrus fruit will not keep for any length of time, even if mildly refrigerated, and will be fresh only a very short time if kept at ordinary temperatures; whether in contact with the air or sealed. For instance, if the juice of an orange or other citrus fruit is expressed, either with or without a certain percentage of the rind oil, this juice develops what can best be described as an old taste within a very short time if it is kept at ordinary temperatures, and will usually acquire that old taste within the course of a half day even if kept at the ordinary temperature of an ice box. This takes place whether the juice is in contact with the atmosphere or if sealed from such contact, and consequently citrus juices are either being expressed at the time of use, or expressed within at least twelve hours or so of time of use and meanwhile kept well refrigerated.

Such difficulties have very severely limited the distribution of fresh citrus juices; with the result that in citrus producing localities large amounts of fruit unsuitable for shipping have gone to waste year after year. The juices of such slightly imperfect fruit are perfectly good; but slight imperfections either make the fruit incapable of standing shipment or make its sale value so low as not to be worth shipping.

As applied to citrus juices, my invention and process completely overcome all these difficulties. The juice expressed from such fruit either with or without a certain percentage of the rind oil, is immediately bottled and sealed from the atmosphere and put into my apparatus. In practice, I put a batch of such bottled juices into the apparatus at some time in the early part of the morning when usually the temperature in the apparatus is around 70° F., or so (this is not a limitation but is average practice). The bottled juice remains in the apparatus throughout the major portion of the day until the middle or latter part of the afternoon, when the temperature has, on the average, fallen again to somewhere around 70° F., the temperature in the meantime having risen to a maximum point varying on different days from as low as 105° or 110° F., to as high as 135° or 140° F., (average conditions). At the end of that period the treatment of the bottled juice is completed. The bottle may be then removed from the structure and stored in any suitable manner at ordinary temperatures.

In stating the range of temperatures as above, and also stating the time element, I do not wish to be understood as stating that such specific temperature range and such specific times are necessary for the full treatment of citrus juice. I have found such ranges of temperature and such time element to be sufficient for the completion of treatment, and that in Southern California such temperature range and time element may be normally easily obtained a great number of days out of the year. I have found, however, that on cool or cloudy days, when the maximum temperature in the vitalizing apparatus does not rise above approximately 100° F., it may be desirable to run the bottles through a course of two days in order to be sure of complete treatment.

In order to give a more specific idea of the temperature range and time period, I cite a few instances where orange juice has been completely treated during one day's exposure:

| Time | Temperature | Weather conditions |
|---|---|---|
|  | ° F. |  |
| 10 A. M. | 72 | Cloudy. |
| 11 A. M. | 62 | Do. |
| 12 M. | 56 | Rain. |
| 1 P. M. | 72 | Partial visibility. |
| 2 P. M. | 98 | Do. |
| 3 P. M. | 114 | Do. |
| 4 P. M. | 90 | Clear. |
| 5 P. M. | 72 | Do. |

The above represents the range of temperature (in the treating structure) and time period in successfully treating bottled orange juice under abnormal atmospheric conditions.

The following is a record of complete treatment on an abnormally warm day:

| Time | Temperature | Weather conditions |
|---|---|---|
|  | ° F. |  |
| 9 A. M. | 120 | Clear sunshine all day. |
| 10 A. M. | 140 |  |
| 11 A. M. | 154 |  |
| 12 M. | 146 |  |
| 1 P. M. | 148 |  |
| 2 P. M. | 138 |  |
| 3 P. M. | 130 |  |
| 4 P. M. | 114 |  |

The following record shows temperatures in the vitalizer for an average warm day in southern California:

| Time | Temperature |
|---|---|
|  | ° F. |
| 9 A. M. | 74 |
| 10 A. M. | 86 |
| 11 A. M. | 94 |
| 12 M. | 118 |
| 1 P. M. | 128 |
| 2 P. M. | 120 |
| 3 P. M. | 112 |
| 4 P. M. | 90 |

As an example of the keeping qualities of the orange juice thus treated, it may be stated that the bottles treated in the last above stated example, although kept at ordinary temperatures and opened to the atmosphere about two months after treatment, remained good for over a month thereafter. The juice used in this example was what is known as whole orange juice; that is, the juice expressed from the pulp together with what rind oil is expressed by crushing the whole orange. It has been my general experience that whole juice treated in the manner here outlined by me, will keep indefinitely, sealed, at ordinary temperatures. The pulp juice of the orange, if treated alone, does not keep so well at ordinary temperatures, but my experience has been that it will keep at least through a period of thirty days at ordinary temperatures, and usually much longer than that. The juices retain their natural fresh odor and taste and, so far as I have been able to determine, are not deleteriously changed in any manner. What change goes on during the period of treatment, or afterwards, I have not been able to ascertain; but some organic change undoubtedly does take place, or is at least initiated, (that is, change in comparison with the condition of untreated juice) because untreated juice from the same initial batch as the treated juice will develop within a comparatively short period a high degree of fermentation.

In carrying out experiments upon orange juice particularly for the purpose of ascertaining as closely as may be the conditions necessary to successful treatment, I have found, among other things, that it is desirable to have the glass roof of the structure placed at a southerly slope of approximately 23° from the horizontal, but I have found that if the roof glass is placed flat, and other conditions are maintained the same as before, the treatment is not so successful. A possible explanation of this circumstance is that if the roof is placed at too great an angle variant from normality to the sun's rays during the most effective period of treatment, there is perhaps too large a proportion of reflection from the glass roof and consequent lowering of penetration of the radiant energy into the structure. As to the position of the bottles in the device, I have found they may be laid at a like angle (parallel with the roof) or may be stood up vertically without any appreciable difference in result.

I have also found by experiment, particularly upon orange juice, that if the bottle is shielded either from the rays of the sun or from the back wall heat reflection, the results are not satisfactory, or at least are not uniformly satisfactory.

What I have said with regard to citrus juice applies generally to the treatment of other fruit juices. All fruit and vegetable juices, or at least to the extent to which I have treated them, are capable of being successfully treated to obtain preservation in natural state in the same manner as above described for orange juice, being treated while sealed from the atmosphere.

I claim:

1. A process for preserving fruit and vegetable juices which comprises heating the juice to a temperature and for a time period adequate to destroy fermentation producing agents originally present in the juice, and simultaneously exposing the juice, without exclusion of its contained air and while sealed against dehydration, to solar radiation in a chamber having a diffusing glass roof and a light reflective interior surface.

2. A process for preserving fruit and vegetable juices to retain in a high degree their natural characteristics of taste unimpaired, which comprises exposing the juice, without exclusion of its contained air and while sealed against dehydration, to solar radiation, and during said exposure heating said juice by means of absorption of said radiation to a temperature and for a time period adequate to destroy fermentation producing agents originally present in the juice.

3. A process for preserving citrus fruit juices to retain in a high degree their natural characteristics of taste unimpaired, which comprises exposing the juice, without exclusion of its contained air and while sealed against dehydration, to solar radiation, and during said exposure heating said juice by means of absorption of said radiation to a temperature and for a time period adequate to destroy fermentation producing agents originally present in the juice, said temperature being less than 140° F.

4. A process for preserving citrus fruit juices to retain in a high degree their natural characteristics of taste unimpaired, which comprises sealing said juice against dehydration in a translucent container without exclusion of its contained air and exposing the juice in said translucent container to solar radiation in such manner that one side of said container is subjected to direct sunlight and another side of said container is subjected to reflected sunlight, and during exposure heating said juice by means of absorption of said radiation to a temperature and for a time period adequate to destroy fermentation producing agents originally present in the juice, said temperature being less than 140° F.

5. A process for preserving lemon juice to retain in a high degree its natural taste unimpaired, which comprises exposing the juice without exclusion of its contained air and while sealed against dehydration, to solar radiation in a chamber having a diffusing glass roof and a light reflective interior surface, and during said exposure heating said juice by means of absorption of said radiation to a temperature and for a time period adequate to destroy fermentation producing agents originally present in the juice.

6. A process for preserving lime juice to retain in a high degree its natural taste unimpaired, which comprises exposing the juice without exclusion of its contained air and while sealed against dehydration, to solar radiation in a chamber having a diffusing glass roof and a light reflective interior surface, and during said exposure heating said juice by means of absorption of said radiation to a temperature and for a time period adequate to destroy fermentation producing agents originally present in the juice.

7. A process for preserving tomato juice to retain in a high degree its natural taste unimpaired, which comprises exposing the juice without exclusion of its contained air and while sealed against dehydration, to solar radiation in a chamber having a diffusing glass roof and a light reflective interior surface, and during said exposure heating said juice by means of absorption of said radiation to a temperature and for a time period adequate to destroy fermentation producing agents originally present in the juice.

LILLIAN BROWN HAZELDINE,
*Administratrix of the Estate of Norton F. W. Hazeldine, Deceased.*